UNITED STATES PATENT OFFICE.

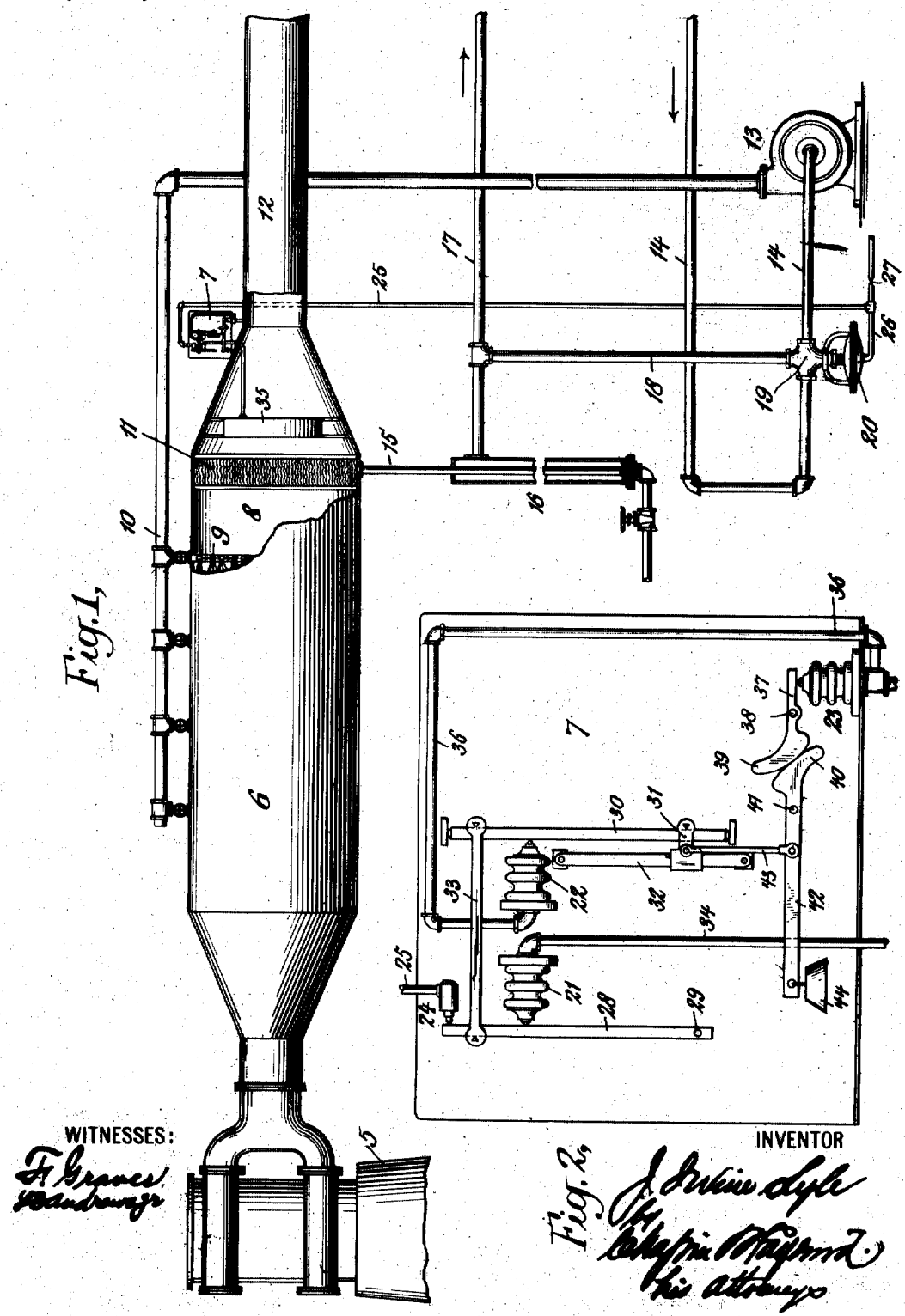

JOEL IRVINE LYLE, OF PLAINFIELD, NEW JERSEY, ASSIGNOR OF ONE-HALF TO EDWARD T. MURPHY, OF PHILADELPHIA, PENNSYLVANIA.

HUMIDIFYING APPARATUS AND MEANS FOR CONTROLLING SAME.

1,001,869.      Specification of Letters Patent.     Patented Aug. 29, 1911.

Application filed November 4, 1910. Serial No. 590,658.

*To all whom it may concern:*

Be it known that I, JOEL IRVINE LYLE, a citizen of the United States of America, and a resident of Plainfield, county of Union, and State of New Jersey, have invented certain new and useful Improvements in Humidifying Apparatus and Means for Controlling the Same, of which the following is a specification, reference being had to the accompanying drawings, forming a part thereof.

My invention relates to means for maintaining a constant and uniform ratio between the moisture in compressed air, and the air by quantity or weight, regardless of its pressure, and of its final temperature.

To accurately determine the quantity of moisture in air at any given pressure, atmospheric pressure for instance, it is common to reduce the temperature of the air, while fully saturating it, to a point wherein a given quantity of the air will just contain the required amount of moisture. Thereafter, provided further moisture be excluded, the air may be raised to any higher temperature, without varying the ratio already determined, and it may also be compressed, providing in compression, or thereafter, the temperature is not allowed to fall below the higher degree of temperature required by the compression. When the air is to be used under pressure however, the foregoing method is uneconomical, because of the amount of refrigeration required; it is far more economical to determine the quantity of moisture after compression, for under such conditions the greater part of the cooling may be effected by the employment of a cooling medium at atmospheric temperatures, such as may be found in river or well water. The practical difficulty in determining the moisture content in air under compression is however that while the amount of moisture which will be carried at the point of saturation by air contained in a given space is dependent upon the temperature of such air, it is in no way dependent upon the quantity of air contained in that space. For instance saturated air at atmospheric pressure, and at a temperature of 31 degrees Fahrenheit, will carry almost exactly 2 grains of moisture per cubic foot, while saturated air at 50 degrees Fahrenheit, and at atmospheric pressure, will contain just double the quantity of moisture or almost exactly 4 grains. But two or three or more cubic feet of air, compressed into a space of one cubic foot, and cooled to the same temperatures, namely 31 or 50 degrees, will carry when saturated just the same amount of moisture, viz., 2 grains at 31 degrees and 4 grains at 50 degrees. If then it be required to maintain a constant ratio between the moisture and the air, by weight or quantity, it will be necessary to raise the temperature of the air, at the moment the moisture is to be determined, to an amount wherein upon saturation it will take up the greater amount of moisture required. For instance, referring to the foregoing illustration, it will be apparent that if it be desired to maintain a uniform ratio of 2 grains of moisture to each cubic foot of air, or in other words as each cubic foot of dry air weighs about 560 grains, of maintaining a ratio of 2 grains of moisture to each 560 grains of air, it will be necessary, when compressing two cubic feet of atmospheric air into a space of one cubic foot, to raise the temperature of the compressed air to 50 degrees Fahrenheit.

The object of my present invention is to provide a simple and efficient means for varying the temperature of the air under compression in the required proportion as the pressure thereof varies, it being understood that while such proportion necessarily follows a fixed law it is a varying and not a direct proportion.

This class of apparatus is particularly useful in connection with metallurgical processes, such as those carried out in Bessemer converters, blast furnaces, and the like, wherein compressed air is employed, the required pressure whereof varies, yet the moisture content of which should remain unchanged.

In order that my invention may be fully understood I will now proceed to describe an apparatus constituting an embodiment thereof, having reference to the accompanying drawings illustrating the same, and will then point out the novel features in claims.

In the drawings: Figure 1 is a view in partial side elevation and partial central vertical longitudinal section of an apparatus constructed in accordance with my invention. Fig. 2 is a face view of the controlling device upon a larger scale.

The apparatus shown consists in general of a blowing engine 5 arranged to compress atmospheric air to the required extent, a humidifying and cooling apparatus 6 for receiving compressed air and which may be termed a dew-point cooler because of the fact that it is arranged to cool the air and to deliver it at the required temperature in a fully saturated condition, and a controlling device 7 for controlling the cooling apparatus in such a way as to determine the temperature at which the air is delivered therefrom.

The air leading from the dew-point cooler will be conveyed to any suitable point of use such for instance, as Bessemer converter, blast furnace, or other apparatus in which it is to be employed as will be well understood.

The dew-point cooler comprises a substantially cylindrical shell inclosing a chamber 8 in which are arranged a plurality of pipes 9 having spray nozzles therein. The pipes 9 constitute branches from a supply pipe 10 through which relatively cold water will be delivered for the purpose of cooling the compressed air delivered to the chamber 8 from the blowing engine 5 and supplying moisture thereto. Eliminator plates 11 are conveniently arranged near the forward end of the dew-point cooler in order to entrap any entrained water, whereby the air delivered through the delivery pipe 12 will be dry but thoroughly saturated, that is to say, while it will be at the dew-point it will carry no free water with it. The cooling water is supplied to the pipe 10 by means of a pump 13 or other suitable means, the supply pipe 14 of the pump connecting with a refrigerating device or other means from which water may be received at a low temperature. The dew-point cooler is provided with a discharge pipe 15 for carrying away the water therein which has been used for cooling purposes and the temperature of which has therefore been raised by its contact with the heated compressed air. This pipe communicates through a water seal 16 with a return pipe 17 such as may lead back to the refrigerating machine to be again cooled therein, and re-supplied through the pipe 14 to the circulating pump 13. The return pipe 17 is provided with a branch 18 which leads to a mixing valve 19 arranged in the supply pipe 14. The mixing valve 19 is of such a character that in one position it will afford direct and open communication through the supply pipe 14 to the pump 13, cutting off any connection from the branch pipe 18 therewith; in another position it will open communication between the branch pipe 18 and the portion of the supply pipe 14 leading from the mixing valve to the pump 13, closing communication between this portion of the supply pipe and the portion thereof upon the other side of the mixing valve; and in intermediate position it will open both of the said connections in varying proportions. By this means it will be seen that water at any temperature from that of the fully cooled water from the refrigerating or other apparatus, to that of the relatively heated return water from the dew-point cooler, may be supplied to the pump 13 in accordance with the position of the valve 19. The position of this valve is regulated by means of a fluid pressure motor 20, and the operation of the said fluid pressure motor 20 is controlled by means of the controlling or regulating device 7. This controlling or regulating device includes three expansion chambers 21—22—23, and an air valve 24 controlled by the combined action of all three of them. In the present example of my invention I have shown the air valve as at the termination of a pipe 25 which leads to the supply pipe 26 for the compressed motive fluid for the fluid pressure motor 20. The said supply pipe 26 has a restricted opening 27 of a diameter smaller than the diameter of the pipe 25. When the valve 24 is closed, fluid under pressure supplied through the pipe 26 will build up in the pipe 25 and in the diaphragm chamber of the fluid pressure motor 20 so as to move the valve 19 in one direction. If the air valve 24 be opened, however, air will be vented through the pipe 25 from the diaphragm chamber of the motor 20 whereby to permit the valve 19 to move in the opposite direction, the restricted opening 27 in the supply pipe 26 preventing the air from being supplied rapidly enough to take the place of that vented through the pipe 25. In other words, the pipe 25 will have a capacity sufficient to allow the air supplied when the valve 24 is opened, to be freely discharged through the said valve 24. It will of course be understood that this particular method of operating the valve 19 is only one of many which may be employed, and is one which is in common use in controlling means of various descriptions at the present day.

The connections between the expansion chambers 21 and 22 comprise a lever 28 fulcrumed at 29 to a stationary part of the device, another lever 30 fulcrumed to a slide 31 mounted upon a guide-way 32, and a link 33 pivotally connecting the free ends of the levers 28 and 30 together. The lever 28 is arranged to engage the moving wall of the expansion chamber 21 while the lever 30 is arranged to engage the moving wall of the expansion chamber 22. The extremity of the lever 28 engages a nipple at the extremity of the pipe 25 and in combination therewith constitutes the valve 24. The expansion chamber 21 is connected by means of a pipe 34 with a closed chamber 35 located in the forward or discharge end of the dew-point cooler, while the expansion chamber 22 is in open communication through a pipe 36 with the interior of the chamber 8 of the dew-point cooler at its discharge end. The closed chamber 35 may be filled with any suitable fluid such as air under pressure or a volatile liquid. Being exposed to the temperature of the air currents passing through the dew-point cooler, the fluid in this closed chamber will expand and contract as the temperature of the air currents rises and falls, and the expansion chamber 21 will be expanded or contracted proportionately thereto. On the other hand, the expansion chamber 22 being directly open to the air currents themselves, the said expansion chamber will be expanded or contracted in proportion as the pressure of the air in the dew-point cooler varies. The expansion chamber 21 is therefore controlled by the temperature of the air currents while the expansion chamber 22 is controlled by the pressure thereof. The two expansion chambers 21—22 bear against their respective levers 28 and 30 in opposite directions so that when in balance the levers 28 and 30 will remain stationary. If, however, the pressure of the air currents should rise the preponderance of pressure in the expansion chamber 22 over that in the expansion chamber 21 will cause the levers 30—28 to move over to the right and to close the air valve 24. The effect of this will be to cause a building up of pressure in the fluid pressure motor 20 of the mixing valve 19, thereby moving the valve 19 so as to close or paritally close the relatively cold water supply and open or partially open the relatively hot water supply. The effect thereof will be that the water delivered to the dew-point cooler will be at a higher temperature, the air passing therethrough will be cooled to a less degree, and the temperature thereof will thus rise to a point wherein the pressure in the expansion chamber 21 will balance or over-balance that in the chamber 22. If the temperature rises too much the valve 24 will be opened and the motor of the mixing valve will operate so as to decrease the supply of hot water and increase the supply of cold, thereby again reducing the temperature in the dew-point cooler. In ordinary operation a point of balance will be arrived at wherein the position of the valve 19 will remain in a constant position to proportion the hot and cold water supply so as to maintain a substantially uniform temperature of the cooling medium, and this will continue for so long a time as the pressure of the air remains constant. When, however, the pressure of the air rises or falls the balance in the controlling device will be disturbed and the air valve 24 will be operated in such a way as to cause the position of the mixing valve 19 to change to increase or decrease the temperature of the cooling medium supplied to the dew-point cooler, whereby the temperature of the air delivered therefrom will be varied in proportion to the pressure thereof. As has already been stated, however, the proportionate variation required between the temperature and pressure of the air delivered from the dew-point cooler is not a direct one. As a matter of fact for each constant unit of rise in temperature the corresponding rise in pressure is a progressively increasing amount. For instance, the dew-point temperature necessary, to maintain 2014 grains of moisture in a thousand cubic feet of free air compressed into the space required to contain such air at 3.48 pounds gage pressure, i. e., 3.48 pounds per square inch above atmospheric pressure, is 39 degrees Fahrenheit. If this temperature is raised one degree the required rise in pressure to compensate therefor is .72, the required pressure being 4.2 pounds per square inch. Now for another rise of one degree in temperature the compensating rise of pressure is .7425, the required pressure being 4.9425 pounds per square inch. Again for a temperature of 48 degrees Fahrenheit the required gage pressure is 10.9126 pounds per square inch, while for one degree increase of temperature the required pressure is 11.8815 pounds per square inch representing an increase of .9689. Thus it will be seen to be necessary to provide compensating means such as will vary the proportionate operation of the means differentially actuated by the variations in the pressure and temperature of the cooler and compressed air. Furthermore, when the temperature variations are transmitted through a pressure device wherein the pressure is varied by, and in consequence of, the temperature changes, as in the present case wherein the temperature actuated means includes a closed chamber containing compressed air or a volatile liquid, it also becomes necessary to compensate for the different ratios of the temperature and pressure variations, such ratios being not directly proportionate as will be seen by the following. For instance, say that it were desired to maintain 28 grains of water vapor per pound of air in the air delivered from the dew-point cooler, and say the gage pressure, i. e., the pressure above atmospheric pressure of the air in the dew-point cooler,—were 6.7 pounds per square inch, the dew-point temperature would then be 43 degrees Fahrenheit. At 43 degrees Fahrenheit the pressure in the expansion chamber 21 would be 24.07 pounds per square inch as against 6.7 pounds per square inch in the expansion chamber 22. This is equal to a ratio between the two pressures of 3.593 to 1. If the gage pressure of the air in the dew-point cooler were to rise to 10.17 pounds per square inch the dew-point would have to rise 47 degrees Fahrenheit, and at the latter temperature the pressure in the expansion chamber 21 would be 24.38 pounds per square inch, the ratio between the two chambers 21 and 22 being then as 2.397 is to 1; with a rise of gage pressure of the air to 15 pounds per square inch the dew point would have to be raised to 52 degrees Fahrenheit which would give a pressure in the expansion chamber 21 of 24.77 pounds per square inch, the ratio of which being as 1.651 is to 1. With a gage pressure of 18.38 pounds per square inch of the air the dew point would be raised to 55 degrees Fahrenheit and the pressure in the expansion chamber 21 would then be 25 pounds per square inch. The new ratio for this would be 1.539 to 1.

From the foregoing it will be seen that the pressure of the air in the dew-point cooler will vary through a range of approximately 12 pounds per square inch, and this will correspond to a range in pressure in the expansion chamber of one pound, and that the ratios between the pressures in the chambers 21 and 22 will vary during this time from 1.359 to 3.593. This variation of ratios may be readily compensated for by varying the lever ratio between the levers 28 and 30, and for this purpose I have provided means for shifting the slide 31 carrying the fulcrum of the lever 30 in the following manner. The expansion chamber 23 is in open communication through a branch of the pipe 36 with the compressed air in the dew-point cooler at its discharge end; hence the expansion chamber 23 will expand and contract in accordance with the variations of the air pressure in the dew-point cooler. The movable wall of the expansion chamber 23 is in engagement with one arm 37 of a rocking lever pivoted at 38 upon the base of the controlling apparatus 7. The other arm 39 of the rocking lever is in engagement with an arm 40 of another rocking lever pivotally mounted at 41 upon the base of the controlling apparatus 7, the other arm 42 thereof being connected by means of a link 43 with the slide 31. The arm 42 of the second said lever is conveniently provided with a counterbalancing weight 44. The coacting faces of the arms 39—40 of the two rocking levers are cam-like in form so that as the arms rock upon their pivotal supports their leverage ratios will vary. The operation of this part of the device is as follows. As the pressure of the air in the dew-point cooler increases the expansion chamber 23 will expand simultaneously with the expansion chamber 22. The levers 37—39 and 40—42 will thereupon be rocked upon their supports to raise the slide 31 so as to shift the fulcrum of the lever 30 to a point nearer the point at which the expansion chamber 22 engages the lever 30. The effect of this will be to increase the effective leverage of the lever 30 relatively with respect to that of the lever 28 in order to establish the greater lever ratio necessary for the increased pressure as above pointed out. As the levers 37—39 and 40—42 thus rock upon their support the lever ratio between them will increase in favor of the weighted end of the lever 42, the said weight 44 opposing the movement of expansion of the chamber 23 as will be well understood, so that as the expansion chamber 23 expands to a certain extent an equilibrium will be established to prevent further movement of the levers 37—39—40—42, until there is a further increase of pressure in the expansion chamber 23 due to a further rise of pressure of air in the dew-point cooler.

Of course it will be understood that the foregoing is but one form of compensating means which I may employ as a part of the controlling device, and furthermore, that the controlling device as a whole may be varied in construction within wide limits without departing from the spirit and scope of my invention. It will also be understood that my apparatus is in nowise limited to the range of pressure and temperatures above recited. The range, however, from 6½ to 18½ has been mentioned as being for ordinary purposes the range usually employed in connection with metallurgical processes.

What I claim is:

1. Means for humidifying and cooling compressed air including means for varying the temperature of the air as the pressure thereof varies, and compensating means for proportioning between the temperature and pressure variations to maintain a constant weight ratio between the moisture and air.

2. Means for humidifying and cooling compressed air including a dew-point cooler, means for supplying a cooling medium thereto, means for varying the temperature of the cooling medium supplied to the cooler as the pressure of the air in the cooler varies, and compensating means for proportioning between the temperature variations of the cooling medium and the pressure variations of the air, whereby the air will be cooled to a point wherein at saturation it will always contain a uniform weight of moisture in proportion to its own weight.

3. The combination with a cooling and humidifying apparatus including means for supplying a cooling medium thereto, and means for supplying air under pressure to the said apparatus, of means for varying the temperature of the cooling medium supplied to the said apparatus, and controlling means therefor governed in accordance with the pressure and temperature of the compressed air in the said apparatus and including compensating means for compensating for the varying ratios between the temperatures and pressures of the air in the dew-point cooler necessary to maintain a predetermined proportion of moisture in the compressed and saturated air.

4. The combination with humidifying and cooling means, and means for supplying air under pressure thereto, of means for controlling the extent to which the air is cooled in the said cooling means, comprising a controlling element, opposed pressure means the one governed by the temperature of the air in the cooling means and the other by the pressure thereof, and lever mechanism operated by the said pressure means and in turn operating the said controlling element.

5. The combination with humidifying and cooling means, and means for supplying air under pressure thereto, of means for controlling the extent to which the air is cooled in the said cooling means, comprising a controlling element, opposed pressure means the one governed by the temperature of the air in the cooling means and the other by the pressure thereof, lever mechanism operated by the said pressure means and in turn operating the said controlling element, and pressure operated means for varying the ratio of the said lever mechanism.

6. The combination with humidifying and cooling means, and means for supplying air under pressure thereto, of means for controlling the extent to which the air is cooled in the said cooling means, comprising a controlling element, opposed pressure means the one governed by the temperature of the air in the cooling means and the other by the pressure thereof, lever mechanism operated by the said pressure means and in turn operating the said controlling element, and pressure operated means also governed by the pressure of the air in the cooling means, for varying the ratio of the said lever mechanism.

7. The combination with humidifying and cooling means, and means for supplying air under pressure thereto, of means for controlling the extent to which the air is cooled in the said cooling means, comprising a fluid pressure operated means and a controlling valve therefor, opposed pressure means the one governed by the temperature of the air in the cooling means and the other by the pressure thereof, lever mechanism operated by the said pressure means and in turn operating the said valve, and pressure operated means for varying the ratio of the said lever mechanism.

8. The combination with humidifying and cooling means, and means for supplying air under pressure thereto, of means for controlling the extent to which the air is cooled in the said cooling means, comprising a fluid pressure operated means and a controlling valve therefor, opposed pressure means the one governed by the temperature of the air in the cooling means and the other by the pressure thereof, lever mechanism operated by the said pressure means and in turn operating the said valve, and pressure operated means also governed by the pressure of the air in the cooling means, for varying the ratio of the said lever mechanism.

9. The combination with humidifying and cooling means, and means for supplying air under pressure thereto, of means for controlling the extent to which the air is cooled in the said cooling means, comprising a controlling element, opposed pressure means the one governed by the temperature of the air in the cooling means and the other by the pressure thereof, lever mechanism operated by the said pressure means and in turn operating the said controlling element, and pressure operated means for varying the ratio of the said lever mechanism, said pressure operated means including weighted lever mechanism for opposing the movement thereof under increased pressure, the said leverage increasing in favor of the weight as the weight is lifted.

10. The combination with humidifying and cooling means, and means for supplying air under pressure thereto, of means for controlling the extent to which the air is cooled in the said cooling means, comprising a controlling element, opposed pressure means the one governed by the temperature of the air in the cooling means and the other by the pressure thereof, lever mechanism operated by the said pressure means and in turn operating the said controlling element, and pressure operated means also governed by the pressure of the air in the cooling means, for varying the ratio of the said lever mechanism, said pressure operated means including weighted lever mechanism for opposing the movement thereof under increased pressure, the said leverage increasing in favor of the weight as the weight is lifted.

11. The combination with a dew-point cooler including means for supplying a cooling medium thereto, and means for supplying air under pressure to the said cooler, of means for governing the temperature of the said cooling medium, comprising a controlling element, opposed pressure means the one governed by the temperature of the air in the said cooler, and the other by the pressure of such air, and lever mechanism operated by the said pressure means and in turn operating the said controlling element.

12. The combination with a dew-point cooler including means for supplying a cooling medium thereto, and means for supplying air under pressure to the said cooler, of means for governing the temperature of the said cooling medium, comprising a controlling element, opposed pressure means the one governed by the temperature of the air in the said cooler, and the other by the pressure of such air, lever mechanism operated by the said pressure means and in turn operating the said controlling element, and pressure operated means for varying the ratio of the said lever mechanism.

13. The combination with a dew-point cooler including means for supplying a cooling medium thereto, and means for supplying air under pressure to the said cooler, of means for governing the temperature of the said cooling medium, comprising a controlling element, opposed pressure means the one governed by the temperature of the air in the said cooler, and the other by the pressure of such air, lever mechanism operated by the said pressure means and in turn operating the said controlling element, and pressure operated means also governed by the pressure of the air in the said cooler, for varying the ratio of the said lever mechanism.

14. The combination with a dew-point cooler including means for supplying a cooling medium thereto, and means for supplying air under pressure to the said cooler, of means for governing the temperature of the said cooling medium comprising a fluid pressure operated means and a controlling valve therefor, opposed pressure means, the one governed by the temperature of the air in the said cooler and the other by the pressure of such air, lever mechanism operated by the said pressure means and in turn operating the said valve, and pressure operated means for varying the ratio of the said lever mechanism.

15. The combination with a dew-point cooler including means for supplying a cooling medium thereto, and means for supplying air under pressure to the said cooler, of means for governing the temperature of the said cooling medium comprising a fluid pressure operated means and a controlling valve therefor, opposed pressure means the one governed by the temperature of the air in the said cooler and the other by the pressure of such air, lever mechanism operated by the said pressure means and in turn operating the said valve, and pressure operated means also governed by the pressure of the air in the cooling means for varying the ratio of the said lever mechanism.

16. The combination with a dew-point cooler including means for supplying a cooling medium thereto, and means for supplying air under pressure to the said cooler, of means for governing the temperature of the said cooling medium, comprising a controlling element, opposed pressure means the one governed by the temperature of the air in the said cooler, and the other by the pressure of such air, lever mechanism operated by the said pressure means and in turn operating the said controlling element, and pressure operated means for varying the ratio of the said lever mechanism, the said pressure operated means including weighted lever mechanism for opposing the movement thereof under increased pressure, the said leverage increasing in favor of the weight as the weight is lifted.

17. The combination with a dew-point cooler including means for supplying a cooling medium thereto, and means for supplying air under pressure to the said cooler, of means for governing the temperature of the said cooling medium, comprising a controlling element, opposed pressure means the one governed by the temperature of the air in the said cooler, and the other by the pressure of such air, lever mechanism operated by the said pressure means and in turn operating the said controlling element, and pressure operated means also governed by the pressure of the air in the cooling means for varying the ratio of the said lever mechanism, the said pressure operated means including weighted lever mechanism for opposing the movement thereof under increased pressure, the said leverage increasing in favor of the weight as the weight is lifted.

18. The combination with humidifying and cooling means, and means for supplying air under pressure thereto, of means for controlling the extent to which the air is cooled in the said cooling means, comprising a controlling element, opposed pressure means the one governed by the temperature of the air in the cooling means and the other by the pressure thereof, connected levers operatively connected with the said pressure means and arranged in their movements to operate the said controlling element, and pressure operated means for shifting the fulcrum of one of the said levers.

19. The combination with humidifying and cooling means, and means for supplying air under pressure thereto, of means for controlling the extent to which the air is cooled in the said cooling means, comprising a controlling element, opposed pressure means the one governed by the temperature of the air in the cooling means and the other by the pressure thereof, connected levers operatively connected with the said pressure means and arranged in their movements to operate the said controlling element, and pressure operated means also governed by the pressure of the air in the cooling means, for shifting the fulcrum of one of the said levers.

20. The combination with humidifying and cooling means, and means for supplying air under pressure thereto, of means for controlling the extent to which the air is cooled in the said cooling means, comprising a fluid pressure operated means and a controlling valve therefor, opposed pressure means the one governed by the temperature of the air in the cooling means and the other by the pressure thereof, connected levers operatively connected with the said pressure means and arranged in their movements to operate the said valve, and pressure operated means for shifting the fulcrum of one of the said levers.

21. The combination with humidifying and cooling means, and means for supplying air under pressure thereto, of means for controlling the extent to which the air is cooled in the said cooling means, comprising a fluid pressure operated means and a controlling valve therefor, opposed pressure means the one governed by the temperature of the air in the cooling means and the other by the pressure thereof, connected levers operatively connected with the said pressure means and arranged in their movements to operate the said valve, and pressure operated means also governed by the pressure of the air in the cooling means, for shifting the fulcrum of one of the said levers.

22. The combination with humidifying and cooling means, and means for supplying air under pressure thereto, of means for controlling the extent to which the air is cooled in the said cooling means, comprising a controlling element, opposed pressure means the one governed by the temperature of the air in the cooling means and the other by the pressure thereof, connected levers operatively connected with the said pressure means and arranged in their movements to operate the said controlling element, and pressure operated means for shifting the fulcrum of one of the said levers, the said pressure operated means including weighted lever mechanism for opposing the movement thereof under increased pressure, the said leverage increasing in favor of the weight as the weight is lifted.

23. The combination with humidifying and cooling means, and means for supplying air under pressure thereto, of means for controlling the extent to which the air is cooled in the said cooling means, comprising a controlling element, opposed pressure means the one governed by the temperature of the air in the cooling means and the other by the pressure thereof, connected levers operatively connected with the said pressure means and arranged in their movements to operate the said controlling element, and pressure operated means also governed by the pressure of the air in the cooling means, for shifting the fulcrum of one of the said levers, the said pressure operated means including weighted lever mechanism for opposing the movement thereof under increased pressure, the said leverage increasing in favor of the weight as the weight is lifted.

24. The combination with a dew-point cooler including means for supplying a cooling medium thereto, and means for supplying air under pressure to the said cooler, of means for governing the temperature of the said cooling medium, comprising a controlling element, opposed pressure means the one governed by the temperature of the air in the said cooler and the other by the pressure thereof, connected levers operatively connected with the said pressure means and arranged in their movements to operate the said controlling element, and pressure operated means for shifting the fulcrum of one of the said levers.

25. The combination with a dew-point cooler including means for supplying a cooling medium thereto, and means for supplying air under pressure to the said cooler, of means for governing the temperature of the said cooling medium, comprising a controlling element, opposed pressure means the one governed by the temperature of the air in the said cooler and the other by the pressure thereof, connected levers operatively connected with the said pressure means and arranged in their movements to operate the said controlling element, and pressure operated means also governed by the pressure of the air in the cooling means, for shifting the fulcrum of one of the said levers.

26. Means for humidifying and cooling compressed air including a dew-point cooler, means for supplying a cooling medium thereto, means for varying the temperature of the cooling medium supplied to the cooler as the pressure of the air in the cooler varies, comprising differentially operated pressure means, the said cooling apparatus being provided with a closed chamber located in the path of the cooled air currents therein, the said closed chamber containing an expansible fluid and being in communication with the said pressure means upon one side thereof, the other side of the said differentially operated pressure means being subjected directly to the pressure of the cooled air.

27. Means for humidifying and cooling compressed air including a dew-point cooler, means for supplying a cooling medium thereto, means for varying the temperature of the cooling medium supplied to the cooler as the pressure of the air in the cooler varies, comprising differentially operated pressure means, the said cooling apparatus being provided with a closed chamber located in the path of the cooled air currents therein, the said closed chamber containing an expansible fluid and being in communication with the said pressure means upon one side thereof, the other side of the said differentially operated pressure means being subjected directly to the pressure of the cooled air, and compensating means automatically operated by the pressure of the cooled air for varying the efficiency of the said differentially operated fluid pressure means upon one side thereof.

28. Means for humidifying and cooling compressed air including a dew-point cooler, means for supplying a cooling medium thereto, means for varying the temperature of the cooling medium supplied to the cooler as the temperature in the cooler varies, comprising a controlling element, lever mechanism therefor, and differentially operated pressure means operating through the lever mechanism to govern the movement of the controller, the said cooling apparatus being provided with a closed chamber located in the path of the cooled air currents therein, the said closed chamber containing an expansible fluid and being in communication with the said pressure means upon one side thereof, the other side of the said pressure means being subjected directly to the pressure of the cooled air, and means also controlled by the pressure of the cooled air, for varying the lever ratio of the said lever mechanism.

J. IRVINE LYLE.

Witnesses:
D. HOWARD HAYWOOD,
LYMAN S. ANDREWS, Jr.